United States Patent
Campbell et al.

[19]

[11] Patent Number: 5,959,534
[45] Date of Patent: Sep. 28, 1999

[54] SWIMMING POOL ALARM

[75] Inventors: Stephen Harold Campbell; Michael Nixon, both of Metairie; Lee Pierre Dupont, Jr., New Orleans, all of La.; George Zane Saxon, Seabrook; William S. Shaw, Austin, both of Tex.

[73] Assignee: Splash Industries, Inc., Seabrook, Tex.

[21] Appl. No.: 08/963,998

[22] Filed: Nov. 4, 1997

Related U.S. Application Data

[63] Continuation of application No. 08/328,866, Oct. 25, 1994, abandoned, which is a continuation-in-part of application No. 08/145,784, Oct. 29, 1993, abandoned.

[51] Int. Cl.⁶ .................................................. G08B 23/00
[52] U.S. Cl. ............................... 340/573.6; 340/573.1; 340/573.4; 340/553; 367/93; 367/94
[58] Field of Search ............................. 340/553, 573.1, 340/573.4, 573.6; 367/93, 94

[56] References Cited

U.S. PATENT DOCUMENTS

| | | | |
|---|---|---|---|
| 2,071,933 | 2/1937 | Miessner | 367/93 |
| 2,655,645 | 10/1953 | Bagno | 367/93 |
| 2,783,459 | 2/1957 | Lienau et al. | 340/530 |
| 2,832,915 | 4/1958 | McCoy | 315/168 |
| 3,155,954 | 11/1964 | Larrick et al. | 340/530 |
| 3,158,850 | 11/1964 | Poznanski | 340/529 |
| 3,486,166 | 12/1969 | Campana et al. | 340/566 |
| 3,504,145 | 3/1970 | Layher | 200/84 R |
| 3,513,463 | 5/1970 | Stevenson et al. | 340/541 |
| 3,732,556 | 5/1973 | Caprillo et al. | 340/566 |
| 3,740,704 | 6/1973 | Suter | 367/94 |
| 3,810,146 | 5/1974 | Lieb | 340/541 |
| 3,867,711 | 2/1975 | Ruscus | 367/136 |
| 4,121,200 | 10/1978 | Colmenero | 340/539 |
| 4,131,887 | 12/1978 | Birkenhead | 367/136 |
| 4,170,769 | 10/1979 | Morris et al. | 340/384.6 |
| 4,187,502 | 2/1980 | Beverly et al. | 340/566 |
| 4,189,722 | 2/1980 | Lerner | 340/565 |
| 4,196,423 | 4/1980 | Carver et al. | 340/566 |
| 4,203,097 | 5/1980 | Manning | 340/566 |
| 4,213,197 | 7/1980 | Magori | 387/94 |
| 4,260,980 | 4/1981 | Bates | 340/904 |
| 4,290,126 | 9/1981 | McFadyen et al. | 367/93 |

(List continued on next page.)

FOREIGN PATENT DOCUMENTS

| | | |
|---|---|---|
| 2172788 | 3/1989 | Australia . |
| 459376 | 6/1989 | Sweden . |

OTHER PUBLICATIONS

EDO Corp.—Piezoelectric Ceramics Catalog.
Mastroc—Guide to Modern Piezoelectrice Ceramics Catalog—Mar. 1993.
PCT Written Opinon, dated Sep. 7, 1995.
The New Encyclopaedia Britannica, vol. 27, 15th Edition, Sound, 1987, pp. 626–631.
Brochure: 20 Eye Opening Reasons Pool's Eye Is The Best Surveillance System You Can Buy, Splash Industries, Inc. Nov. 14, 1993.
Video: Where's Katy?, Splash Industries, Inc., first shown Nov. 14, 1993.

*Primary Examiner*—Benjamin C. Lee
*Attorney, Agent, or Firm*—Fish & Richardson

[57] ABSTRACT

A method and apparatus for detecting unauthorized or accidental entry of an object into a body of water is disclosed, wherein the frequency or frequency range of sound waves in a body of water generated by the entry of the object into the body of water is determined. Then the sound waves having the frequency generated in the body of water are detected and an electrical output waveform representative of the amplitude of the sound wave in the frequency is generated. The amplitude of the electrical output waveform is subsequently averaged, so that an alarm signal is generated when the amplitude of the electrical output waveform exceeds the averaged amplitude by a predetermined value in a predetermined period of time. Once the alarm signal is generated an alarm is activated.

46 Claims, 9 Drawing Sheets

U.S. PATENT DOCUMENTS

| | | | |
|---|---|---|---|
| 4,346,374 | 8/1982 | Groff | 340/573.1 |
| 4,349,897 | 9/1982 | Boehme et al. | 362/94 |
| 4,541,080 | 9/1985 | Kodaira | 367/94 |
| 4,639,902 | 1/1987 | Leverance et al. | 367/93 |
| 4,747,085 | 5/1988 | Dunegan et al. | 367/93 |
| 4,853,691 | 8/1989 | Kolbatz | 340/573 |
| 5,043,705 | 8/1991 | Rooz et al. | 367/93 |
| 5,049,859 | 9/1991 | Arnell | 340/573.6 |
| 5,091,714 | 2/1992 | de solminihac | 340/573 |
| 5,121,104 | 6/1992 | Nelson et al. | 340/566 |
| 5,268,673 | 12/1993 | Nelson et al. | 340/566 |

SWIMMING POOL ALARM

This is a continuation of application Ser. No. 08/328,866, filed Oct. 25, 1994, now abandoned, which is a continuation-in-part of application Ser. No. 08/145,784, filed Oct. 29, 1993 and entitled "SWIMMING POOL ALARM", now abandoned.

BACKGROUND OF THE INVENTION

1. Field of the Invention

This invention pertains to a swimming pool alarm and more specifically to a swimming pool alarm that utilizes a standing wave pattern set up from a sound wave generator to detect unauthorized or accidental entry of an object into the pool.

2. Description of the Prior Art

Swimming pools can be a hazard when left unattended. Many attempts have been made to develop a swimming pool alarm, which when activated, is capable of sounding an alarm when an unauthorized or accidental entry of an object or individual into the swimming pool occurs. The previous attempts are plagued with problems, which in many instances renders the device ineffective or inoperable.

Some of the systems on the market today use water pressure measurement devices in conjunction with diaphragms to detect the pressure differential in the water due to any movement of the water. These systems are susceptible to generating many false alarms, because they are incapable of differentiating between movement in the water caused by wind or leaves and movement due to entry of an object into the water, such as a person.

Another system presently on the market utilizes a mercury switch to detect movement of the water. However, this system is also susceptible to generating false alarms, because again even the slightest movement will activate the switch.

Other types of devices utilize electronic circuits incorporating two probes spaced apart above the water as a switch, such as those described in Australian Patent No. 8821727 and U.S. Pat. No. 3,732,556. An alarm is activated by the closing of the switch with the momentary splash of water between the probes. Again this system is very susceptible to false alarms.

None of the above described systems are capable of differentiating between the different stimuli that cause water movement. U.S. Pat. No. 5,043,705, discloses a device that distinguishes different types of objects in a body of water. A costly complex sonar device is implemented to monitor the bottom of the pool for any objects that are not moving. This invention is designed to scan only specific layers of the pool, such as the bottom or the top layer of the pool, while ignoring all other parts of the pool. A very complex algorithm is implemented to determine when a body is laying still on the bottom of the pool. Thus, this system requires the person to be unconscious and at the bottom of the pool, at which time it may be too late to revive them.

U.S. Pat. No. 4,747,085 described another device which utilizes a transmitter producing a standing wave in the pool and a receiver with circuitry to detect interference in the standing wave. This system is susceptible to false alarms due to the use of a separate transmitter and receiver. This configuration is inherently subject to an effect where vibrations from the transmitter travel directly to the receiver through the pool alarm device casing and pool sides, causing interference with the signal derived from the reflected waves from the pool. False alarms may also be caused by background noise. A major source of background noise is rain and wind, both of which usually create noise which gradually increases in intensity, often rising to levels sufficient to cause the pool alarm to trigger. Unless a method for adjusting the alarm trigger threshold to account for high levels of background noise is provided, the device will be subject to spurious alarms.

Therefore, it is a feature of the present invention to provide an improved swimming pool alarm that is not susceptible to false alarms.

It is another feature of the present invention to provide a pool alarm that can distinguish between an unauthorized entry of a person in the pool and waves or other inanimate objects falling into the pool, such as leaves.

It is yet another feature of the present invention to provide an improved affordable pool alarm.

It is another feature of the present invention to provide an improved pool alarm that can detect the unauthorized or accidental entry of an individual prior to the individual becoming unconscious.

Other features are apparent to those familiar with swimming pool alarms and alarm systems.

SUMMARY OF THE INVENTION

New methods and apparatuses for detecting entry of an object into a body of water have been developed to overcome the deficiencies of the prior art. In the preferred embodiment of this invention, a method of detecting entry of an object into a body of water, typically a pool, is disclosed which comprises the steps of: identifying a frequency or frequency range of sound waves in a body of water generated by the entry of an object into the body of water; detecting the sound waves generated in the body of water; producing an electrical output waveform representative of the amplitude of the sound wave in the frequency or frequency range; averaging the amplitudes represented in the electrical output waveform; generating an alarm signal when an amplitude in the electrical output waveform exceeds the averaged amplitude by a predetermined value and activating an alarm when the alarm signal is generated. Depending on the implementation of this method, rectifying the electrical output waveform prior to averaging the amplitudes represented therein can facilitate the averaging process.

A sound wave, of a frequency different from the frequency or frequency range of the object entering the body of water, preferably an ultrasonic sound wave, can be generated into the body of water to set up a standing wave acting as a carrier wave. The transmitted sound wave is filtered out from the electrical output waveform before averaging the amplitudes represented in the waveform.

An alarm signal can be transmitted to a remote system in order to activate a remote alarm when the amplitude of the electrical output waveform exceeds the averaged amplitude by a predetermined value in a predetermined period of time.

In a pool, the activation of a pool pump or a pool sweep, both of which may generate sound waves in the same frequency or frequency range as an object falling into the water, can be detected, so that alarm signal generation process can be deactivated to prevent a false alarm.

Similarly, an apparatus for detecting entry of an object into a body water is disclosed, comprising: a sound wave detector for receiving sound waves generated in at least one predetermined frequency by an object entering the body of water and producing an electrical output waveform representative of the amplitude and frequency of the detected sound wave; a rectifier electrically connected to the sound wave detector for rectifying the electrical output waveform; an integrator/comparator electrically connected to the rectifier for averaging the amplitudes represented in of the rectified electrical output waveform and producing an alarm signal when an amplitude in the electrical output waveform reaches the averaged amplitude by a predetermined value; and an alarm electrically connected to the integrator/comparator that is activated when the alarm signal is generated. A signal generator for transmitting a sound wave into the body of water to set up a standing wave that acts as a carrier wave can be included in the apparatus, as long as a filter for removing the transmitted sound wave from the electrical output waveform before entering the integrator/comparator is also included.

Even though the integrator/comparator output can be used to generate an alarm signal, a processing means can be interposed between the integrator/comparator and the alarm for activating the alarm when the alarm signal is generated. The processing means can be used to perform other functions, such as disabling alarm signal generation when a pool pump or pool sweep is activated.

The processing means could be electrically connected to the sound wave generator or the rectifier, dispensing with the need for the rectifier/integrator/comparator or integrator/comparator, respectively, for averaging the amplitude of the electrical output waveform and generating an alarm signal when the amplitude exceeds the averaged amplitude by a predetermined value.

Also disclosed is another apparatus for detecting entry of an object into a body of water, comprising: means for detecting the sound waves of at least one frequency in a body of water generated by the entry of the object into the body of water; means connected to the sound wave detecting means for producing an electrical output waveform representative of the amplitudes of the sound waves in the at least one frequency; means connected to the electrical output waveform generating means for rectifying the electrical output waveform; means connected to the rectifying means for averaging the amplitude of the rectified electrical output waveform and for producing an alarm signal when the amplitude of the electrical output waveform exceeds the averaged amplitude by a predetermined value; and means connected to the averaging means for activating an alarm when the alarm signal is generated.

In an alternate embodiment of this invention a method of detecting entry of an object into a body of water is disclosed, comprising the steps of: transmitting a sound wave, preferably a sound wave generated in an ultrasonic frequency, into the body of water to set up a standing wave; detecting the transmitted sound wave and producing an electrical output waveform representative of the amplitude and frequency of the detected sound wave; averaging the amplitudes represented in electrical output waveform; generating an alarm signal when an amplitude of the electrical output waveform is greater than a predetermined value above the averaged amplitude indicating the entry of the object into the body of water; and activating an alarm when the alarm signal is generated.

The electrical output waveform could be rectified to facilitate the averaging process. If the waveform is rectified, then determination of the average amplitude of the electrical output waveform prior to entry of the object into the body of water could be effected by continuously integrating the electrical output waveform.

In this embodiment of the invention the frequency of the waveform could also be monitored to detect when the frequency of the electrical output waveform reaches a predetermined frequency indicating the entry of the object into the body of water in order to activate the alarm. The predetermined frequency could be represented by a predetermined number of slope changes in the electrical output waveform detected within a predetermined time period. The alarm signal could also be transmitted to a remote system in order to activate a remote alarm. Again, a sound wave generated in an ultrasonic frequency is preferred.

In yet another embodiment of this invention, an apparatus for detecting entry of an object into a body water is disclosed, comprising: means for transmitting a sound wave into the body of water to set up a standing wave; means for detecting the transmitted sound wave and producing an electrical output waveform representative of the amplitude and frequency of the detected sound wave; means for averaging the amplitudes represented in the electrical output waveform; means generating an alarm signal when an amplitude in the electrical output waveform is greater than a predetermined value above the averaged amplitude indicating the entry of the object into the body of water; and means for activating an alarm when the alarm signal is generated. The means for averaging could be a rectifier/integrator/comparator assembly, processing means, or any other mechanism used for averaging amplitudes of signal.

In another embodiment of this invention, an apparatus for detecting entry of an object into a body water is disclosed, comprising: a signal generator for transmitting a sound wave into the body of water to set up a standing wave; a sound wave detector for receiving the transmitted sound wave and producing an electrical output waveform representative of the amplitude and frequency of the detected sound wave; processing means electrically connected to the sound wave detector for averaging the amplitude of the electrical output waveform to detect when the amplitude of the electrical output exceeds a predetermined value above the average amplitude indicating the entry of the object into the body of water beyond the predetermined size and for producing an alarm signal; and an alarm electrically connected to the processing means that is activated when the alarm signal is received.

BRIEF DESCRIPTION OF THE DRAWINGS

So that the manner in which the above-recited features, advantages and objects of the invention, as well as others, which will become apparent, are attained and can be understood in detail, a more particular description of the invention briefly summarized above may be had by reference to the embodiments thereof that are illustrated in the drawings, which drawings form a part of the specification. It is to be noted, however, that the appended drawings illustrate only preferred embodiments of the invention and are, therefore, not to be considered limiting of its scope for the invention may admit to other equally effective embodiments.

In the drawings

DESCRIPTION OF THE PREFERRED EMBODIMENT

Figure 1:
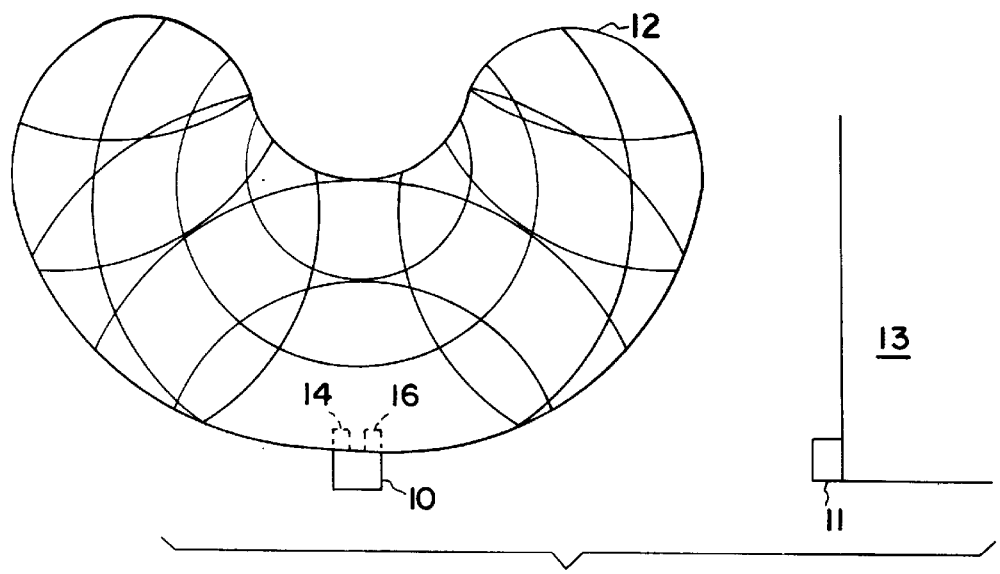
FIG. 1 is a diagrammatic representation of the top view of a free form pool showing a standing wave pattern generated by the preferred embodiment of this invention.

Now referring to the drawings and first to FIG. 1, a swimming pool alarm constructed in accordance with this invention is shown next to a typical free-form swimming pool. Battery operated pool alarm system 10 mounted on the side of pool 12 is capable of transmitting signals to remote unit 11 mounted on house 13. Pool intrusion detection system 10 includes ultrasonic transducer 14 and ultrasonic receiver 16, which are submerged in the water. The electronics connected to transducer 14 can either be a continuous or a regular periodic signal-producing circuit for driving the transducer, which are well known in the art.

Ultrasonic transducer 14 produces a sound wave of an ultrasonic frequency into the water, which when reflected off the pool walls and water-to-air interface generates a standing wave pattern that is detected by ultrasonic receiver 16. When the wave pattern is disturbed by an object falling into the body of water, a change in the wave pattern is detected at ultrasonic receiver 16 and an alarm signal is generated by both intrusion detection system 10 and remote unit 11.

In order to prevent false alarms, intrusion detection system 10 is designed to monitor the sound waves detected at the receiver to determine whether a predetermined amplitude at a predetermined frequency or frequency range is reached. The state of the pool water may vary from being placid to being agitated by wind or rain causing the amplitude and frequency of the detected sound wave to vary. However, the variation will be less than that caused by an object falling into the water. The variations in the wave are due to the interruption of the "null points" set up in the standing wave. For example, an object falling through the water at approximately 24–36 inches per second passes through the null points at a predictable rate of approximately 3–6 null points in 24 inches of water. An object such as this will change the amplitude of the wave detected at the receiver to a different degree than would wind or rain agitation. Predictable amplitude variations and frequency variations are associated with an object of a specific size. The size of the object can be defined in terms of weight or overall dimension. Therefore, the predetermined amplitude and predetermined frequency are representative of an unauthorized intrusion of an object of a predetermined size and not normal agitation.

Figure 2:
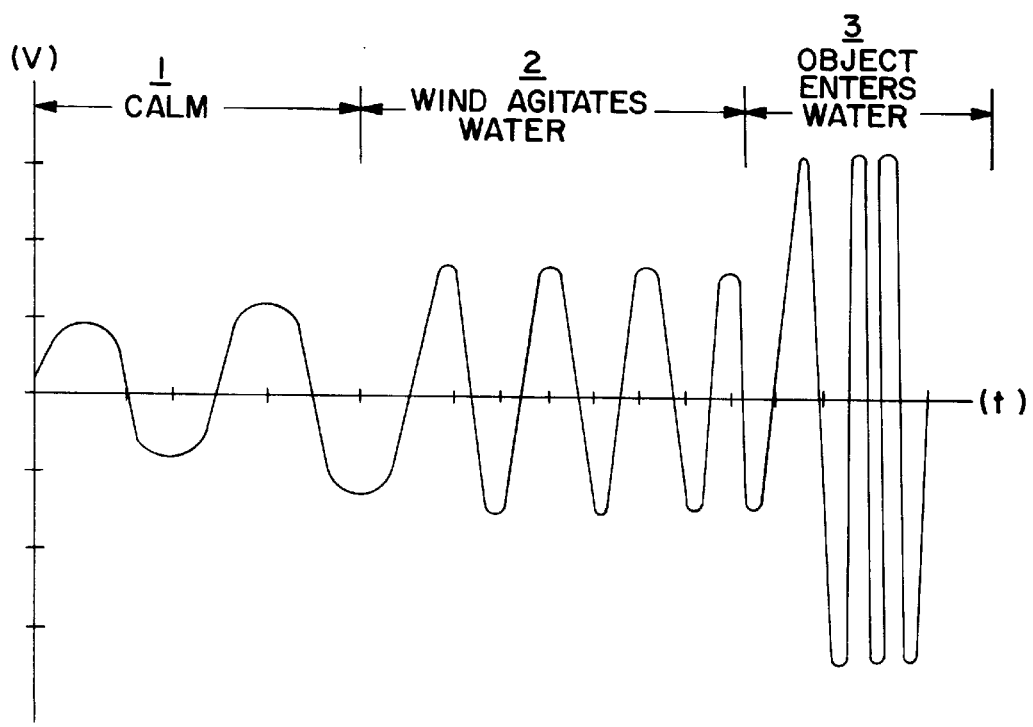
FIG. 2 shows a graphical representation of the electrical output waveform of the ultrasonic waves received by the ultrasonic receiver of the in accordance with an embodiment of this invention.

FIG. 2 shows an example of a theoretical, predictable waveform generated by ultrasonic receiver 16. The first zone represents an electrical output waveform resulting from the ultrasonic waves and noise only. There are no objects and no external factors agitating the water, such as wind or rain. The waveform maintains a relatively constant amplitude and frequency. When wind agitates the water, the amplitude and frequency of the waveform increase, as shown in zone two. The waveform resulting from an object entering the water and intersecting the "null points" of the standing wave is shown in zone three. The amplitude and frequency are significantly higher than the amplitude and frequency of the waves shown in the other two zones. By monitoring a detected wave such as the one shown in FIG. 2 and distinguishing between the amplitudes and/or the frequencies of the various conditions, the intrusion detection system 10 is capable of generating an alarm when the conditions of zone 3 are met. The detection of rise in frequency alone or in combination with amplitude detection can be used for creating the alarm signal.

Figure 3:
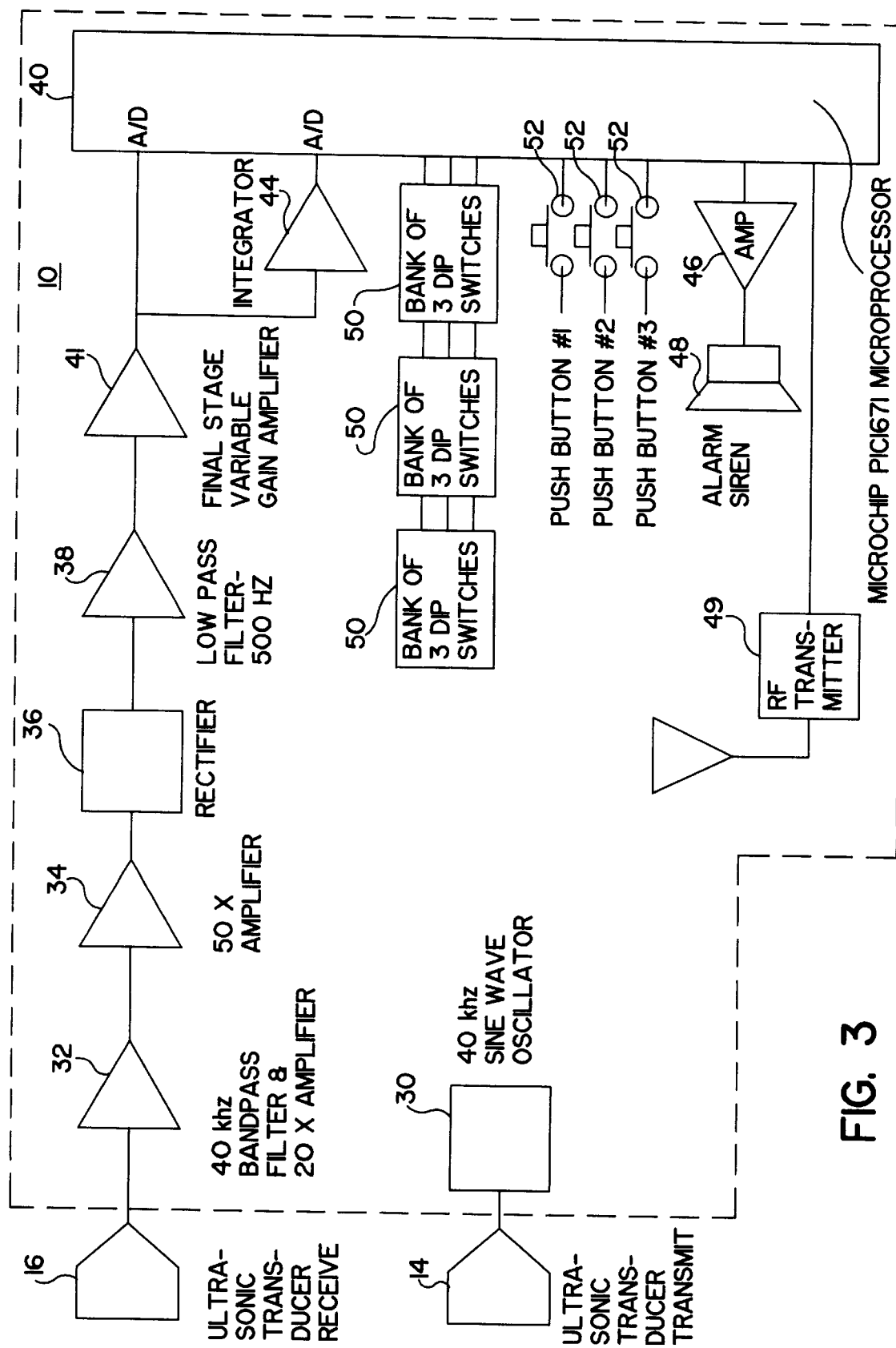
FIG. 3 shows a block diagram of the circuitry used to detect the unauthorized or accidental entrance of an object into a body of water in accordance to an embodiment of this invention.

Intrusion detection system 10 includes the circuit elements shown in FIG. 3. In the preferred embodiment, a 40 kilohertz sine wave oscillator 30 is used to power ultrasonic transducer 14, which in one embodiment of this invention is a TR89 Ultrasonic Transducer manufactured by Massa Products Corp. of Hingham, Mass. The sound waves transmitted by ultrasonic transducer 14 ultimately set up a standing wave pattern in the pool. Ultrasonic receiver 16, preferably a TR89 Ultrasonic Receiver also manufactured by Massa Products Corporation of Hingham, Mass., is placed next to ultrasonic transducer 14 to receive the reflected signals. The ultrasonic transducer and receiver are preferably placed next to each other to maintain the overall compact size of the intrusion detection system 10. However, there is no requirement that they be placed together.

Any signal generator capable of establishing the type of standing wave form described above can be employed instead of the sine wave oscillator described above. For example, a pulse generator having a regular period equivalent to the sine wave can be employed, if desired.

Ultrasonic receiver 16 is protected by zener diodes (not shown) to prevent over voltage conditions at the receiver. The received signal is passed through 40 kilohertz band pass filter 32, which amplifies the signal by about 20 times. The resulting signal is then passed through amplifier 34 to amplify the signal another 50 times. The amplified signal is rectified at rectifier 36 and passed through a low pass filter 38 having a gain of 1 and cutoff frequency of 500 hertz. The signal is amplified once again by adjustable gain amplifier 41 with the gain capable of adjustment to achieve the maximum voltage range allowed by the microprocessor ("MPU") 42.

The MPU used in this embodiment of the invention is the PIC1671 microprocessor manufactured by Microchip, Inc. of Chandler, Ariz. This MPU has on board analog-to-digital ("A/D") converter capabilities and read only memory ("ROM") for storing the control software. This MPU is particularly well suited for this application, because of its low power consumption, which prolongs the battery life of the system. Any microprocessor with similar capability could be substituted, or a circuit comprising discrete components could be designed by one of ordinary skill in the art to perform the MPU functions.

The direct current ("DC") voltage level from variable gain amplifier 41 is connected to one of the A/D converter ports on MPU 42. The same signal from variable gain amplifier 41 is also passed through integrator circuit 44 prior to entering a second A/D converter in MPU 42.

The integrator circuit is easily constructed by techniques well known to those of ordinary skill in the art. The function of integrator circuit 44 is to provide an average or mean signal representing the state of the pool prior to object entry. The state could be perfectly calm or agitated due to wind or rain. However, the use of integrator circuit 44 is not critical, because currently MPU 42 can be programmed by techniques well known to those of ordinary skill in the art to perform the integrating function.

MPU 42 then monitors the signal at the first A/D converter to determine when the signal consists of characteristics similar to those shown in zone 3 of FIG. 2. MPU 42 produces an alarm signal at amplifier 46 to activate alarm 48 and simultaneously sends a signal to remote unit 11 through radio frequency transmitter 49. Alarm 48 can be any mechanism sufficient to alert someone that an unauthorized or accidental entry occurred, such as a siren, bell, or other device that produces an audible sound and/or a device that produces a visible alarm, such as a flashing light.

Dip switches 50 are used to select 1 of 27 possible security codes. The codes perform two functions: one for disarming the system and the other for verifying the signals received at the remote unit.

Once the dip switches are set, the only way to disarm the system is to enter the appropriate code on buttons 52. Upon code detection, the MPU disarms the system for a preselected period of time to allow people to access the water without causing an alarm condition. MPU 42 is programmed to automatically rearm the system after a period of time or, in the alternative, rearm the system when any of buttons 52 are depressed.

The code is also sent to remote unit 11 via radio frequency every 3 minutes so as to selectively identify the source of the radio frequency signal as the correct source which prevents false alarms at the remote.

In addition to the safety feature introduced by the use of a security code, the MPU is also programmed to allow a user to have the alarm disabled for a period of time every 24 hours to allow for automatic pool maintenance activities. Also, since the pool side unit is battery operated with a low power battery detection system, the MPU causes an alarm at pool side and at the remote unit when a low battery condition exists.

In an attempt to reduce the chances of the system malfunctioning, the MPU prompts the pool side unit to send a status message to the remote every 3 minutes. If the remote unit does not receive a message for an hour then an alarm is sounded at the remote identifying a lack of communication with the pool side unit.

Figure 4:
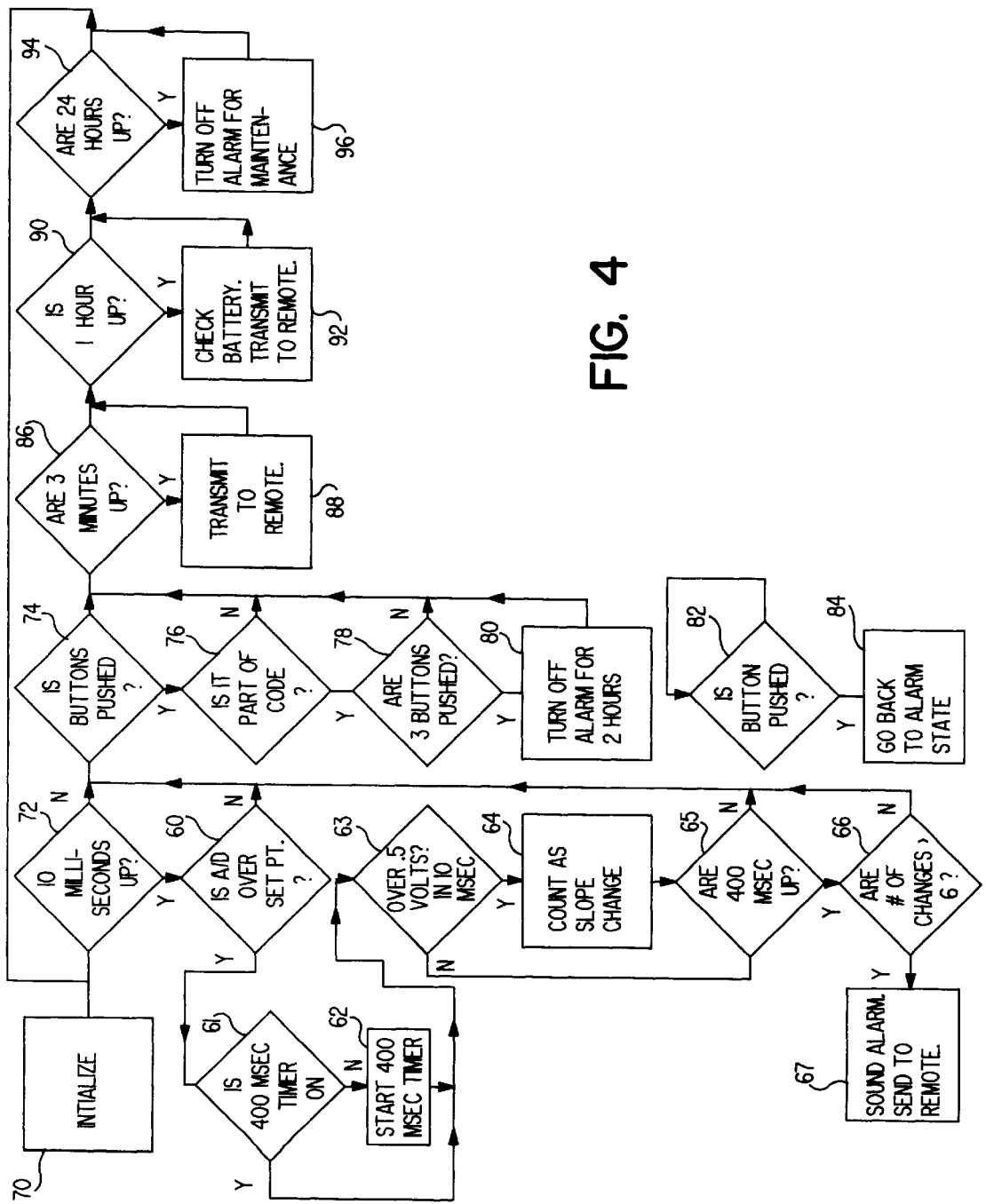
FIG. 4 shows a flowchart of the software used to control electronic circuitry shown in FIG. 3

FIG. 4 shows the flowchart of the software used to control intrusion detection system 10. When the batteries activate the system, the system is initialized in step 70. The system begins monitoring the electrical output waveform detected at ultrasonic receiver 16.

The amplitude and frequency monitoring functions of the intrusion detection system are performed by the following steps. If the system detects that 10 milliseconds have passed, step 72, the A/D converter connected to the DC level of the amplified receiver output is monitored to determine if the amplitude exceeds the average level or set point established at the second A/D converter connected to integrator circuit 44, step 60. When the average level is exceeded, then a 400 millisecond timer is started, steps 61 and 62. The amplitude of the first A/D is continuously monitored during the 400 millisecond period. Each time a half of a volt change in amplitude is detected during a 10 millisecond period, a slope change is counted, steps 63 and 64. Then steps 74, 86, 90, 94, 72, 60, 61, 62, 63, and 64 are repeated until 400 milliseconds have passed, step 65.

After 400 milliseconds, if more than six slope changes are detected, then an alarm is sounded and a signal is sent to the remote unit to indicate unauthorized or accidental entry into the pool, steps 66 and 67. Otherwise, the MPU continues to execute the software shown in FIG. 4.

The remainder of the flowchart is dedicated to assuring the system is functioning properly. For example, buttons 52 are monitored to determine if anyone of them is depressed, step 74. If any buttons are depressed, then the MPU checks to see if any of the buttons are part of the security code designated by the state of dip switches 50, step 76. If any of the buttons are part of the code, then the MPU checks to see if the three buttons are depressed in the proper sequence, signifying a disarming request, step 78. If the status of the buttons indicates that the alarm should be disarmed, then the alarm is turned off for a two hour period, step 80. The system remains in that state until either two hours elapses or a button is pushed to request reactivation, step 82. If the activation button is depressed then an interrupt is generated and MPU goes back to the alarm state, step 84, at which time the monitoring process restarts through step 72.

When step 72 and 74 are performed and no buttons are depressed, the MPU checks to see if 3 minutes have passed since the last time it transmitted a signal to remote unit 11, step 86. If 3 minutes have passed, the microprocessor transmits a signal to the remote unit 11, step 88.

MPU 42 also performs a battery test once an hour to monitor the power level of the battery, step 90 and 92. The status is indicated on the actual unit itself and at the remote unit.

In order to accommodate automatic maintenance quipment used by many swimming pool owners, MPU 42 disarms he alarm for a predetermined period of time, so that the maintenance can be performed, step 94 and 96.

The features mentioned above are safety measures and maintenance facilitators implemented to ensure the continuing functionality of the system. These features are not necessary to detect the unauthorized entry of a body into the pool.

In known areas of spurious signal radiations that cause false alarms, filtering or frequency modulation transmission/ detection can be employed to discriminate against signals that might otherwise interfere with the operation described.

In the preferred embodiment of this invention, the electrical waveform representative of waves of a frequency or frequency range generated by an object entering a body of water, such as a pool, is analyzed to determine when the amplitude of the waveform exceeds a predetermined value above the average amplitudes represented in the waveform.

Figure 5:
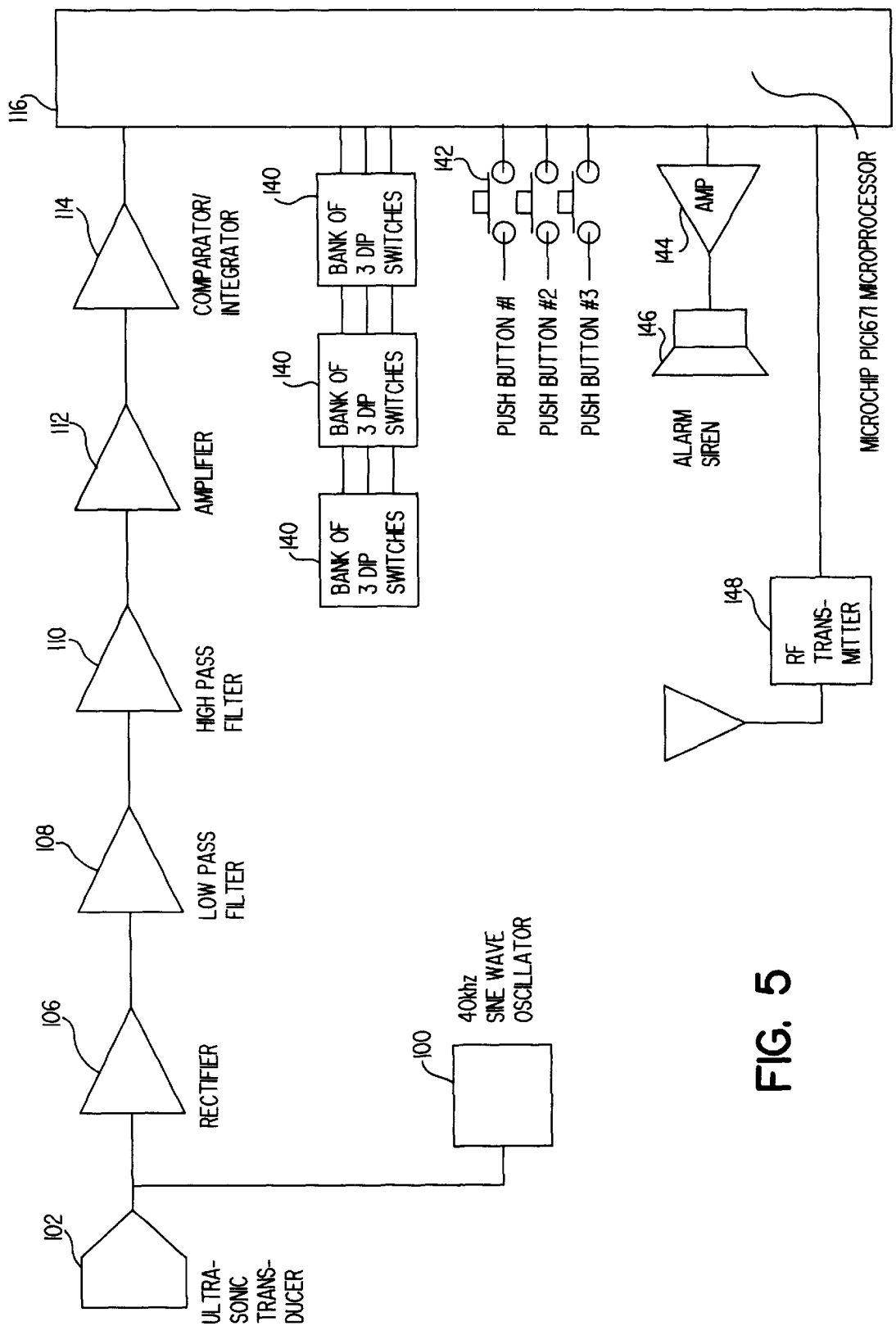
FIG. 5 shows a block diagram of the circuitry used to detect the unauthorized or accidental entrance of an object into a body of water in accordance with the preferred embodiment of this invention.
Figure 6:
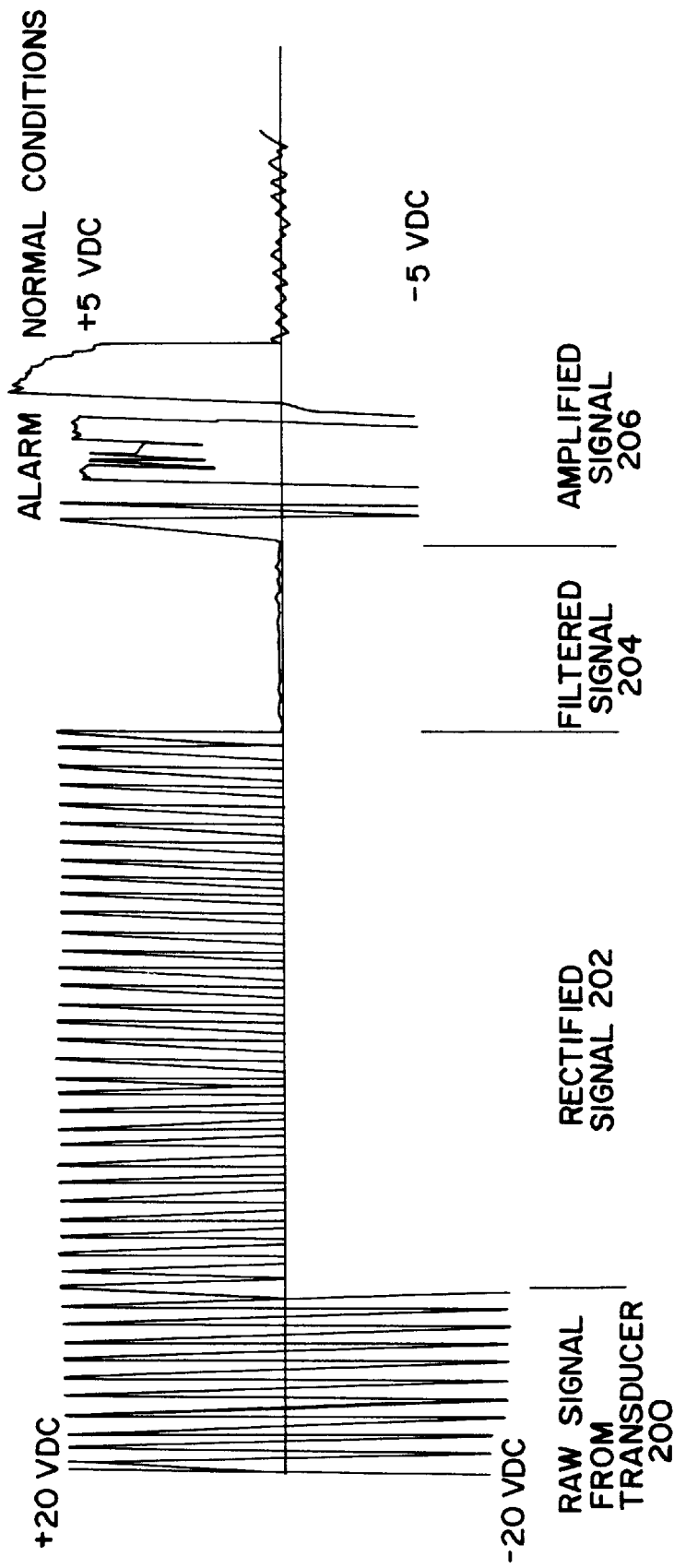
FIG. 6 shows a graphical representation a typical electrical waveform measured at the transducer and at other various points through the circuitry of FIG. 5.

FIG. 5 shows a block diagram of the preferred embodiment of this invention that utilizes a single ultrasonic transducer to transmit a 40 kHz sound wave, or signal, into the pool and to receive signals from the reflected waves, dispensing with the requirement for a separate receiver. The single ultrasonic transducer of this embodiment of the invention replaces the transmitter 14/receiver 16 (FIG. 1) arrangement of the embodiment described above.

Oscillator 100 provides an exciting voltage across the terminals of transducer 102, creating a standing wave in the swimming pool as previously described. The reflected waves forming the standing wave pattern impact against the transducer creating an additional voltage across the terminals of the piezoelectric transducer due to the generator effect of the transducer. This generated voltage is superimposed on the voltage from the oscillator driving the transducer. The resultant waveform is then filtered and monitored to detect the presence of a person in the pool as described below.

An object entering the pool creates waves by the movement of the object in the water, and also causes a change in the pattern of reflected waves. The amplitude of a wave reflected from an object in water is dependent on the difference between the density of the object and the density of the water. The greater the density difference, the greater the amplitude of the reflected wave. For example, the density difference between water and the bottom or sides of the pool is much less than the density difference between the water and an air pocket in the water. Since the density difference between air and water is high, an air pocket introduced into the water reflects a greater amount of the wave energy than the pool bottom or sides. The water-to-air interface at the surface of the water is also highly reflective and a disturbance to the water surface in one location also produces a significant change in the amplitude and frequency of the reflected waves sensed by the transducer. Thus, the sudden introduction of an air pocket into the water produces a significant change in the amplitude and the frequency in the reflected waves sensed by the transducer. When a person enters the water, pockets of air, in the form of lungs and other body cavities as well as entrained air, are introduced into the water disturbing the water in that location. Thus, disturbance to the standing wave in the pool from a person entering and moving within the water is more pronounced than disturbances caused by objects without air pockets.

The disturbance to the standing wave may be viewed as a low frequency signal superimposed on a high frequency carrier. The typical range of movement from persons in the pool is 0.3 to 1.5 meters per second, corresponding to a wave frequency of 5 to 40 Hz in water. Thus, this embodiment of the invention is designed to detect signals generated across the terminals of the transducer in this low frequency range by a person entering the pool.

Thus, the voltage across the terminal of transducer is passed through rectifier 106 to low pass filter 108, which eliminates signals above 50 Hz, including, the 40 kHz signal from the oscillator and 60 Hz noise sources. Typical sources of 60 Hz noise include interference from nearby power lines and equipment operating near the pool such as pool pumps.

High pass filter 110 is used to remove low frequency signals below 5 Hz, thus eliminating low frequency interference from outside noise sources conducted through the ground, pool sides, and pool water. These noise sources typically include nearby traffic, people running near the pool, and disturbances on the surface of the water such as wind, rain, and leaves. Frequency analysis of noise from these sources indicates most of the noise is concentrated at frequencies below 5 Hz.

Thus, after passing through low pass filter 108 and high pass filter 110, the resulting filtered signal includes only signals in the 5 to 50 Hz range. Low pass filter 108 and high pass filter 110 are both comprised of a transistor/capacitor/resistor arrangement, easily configured using techniques well known to those of ordinary skill in the art.

Figure 8:
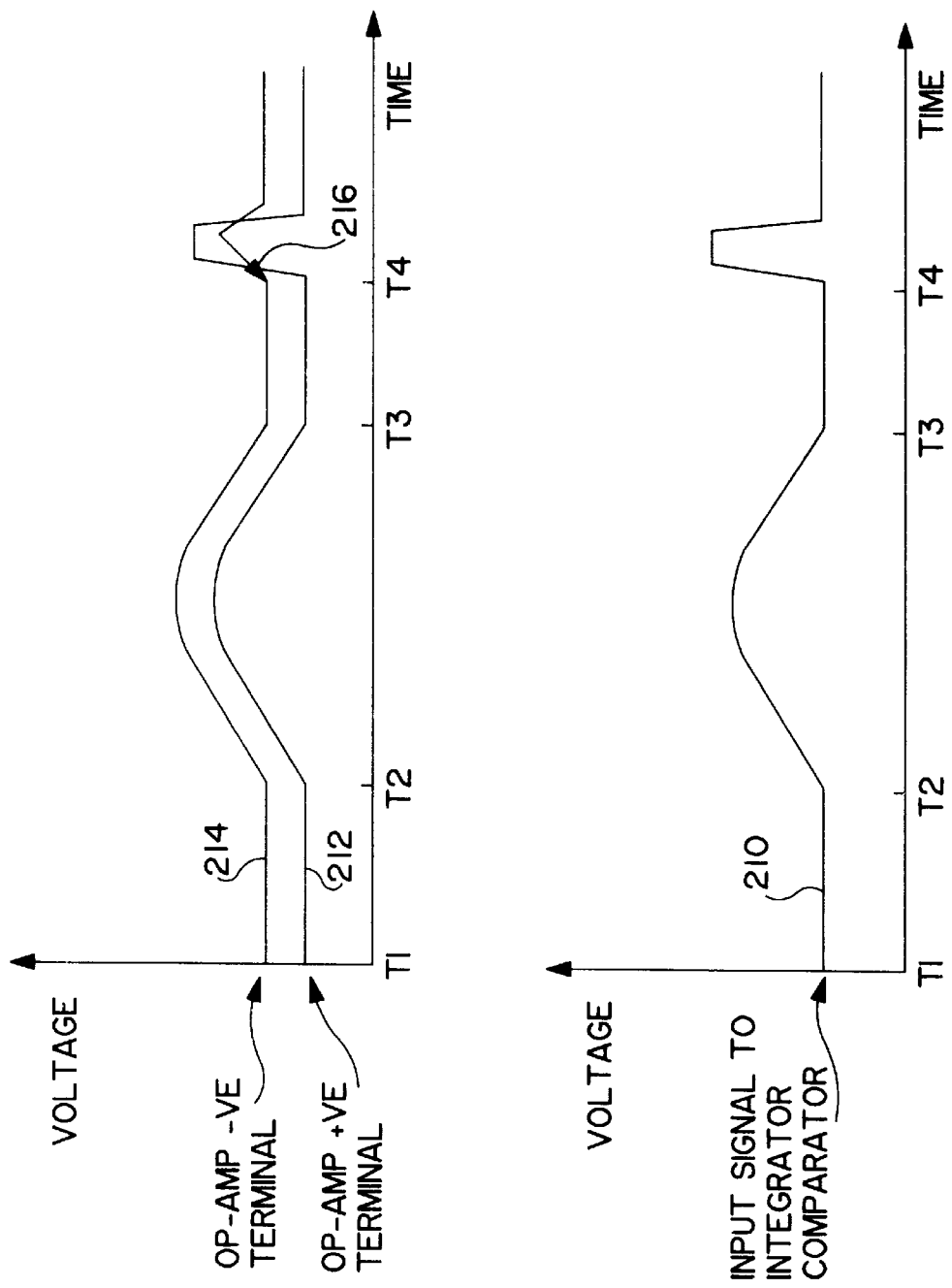
FIG. 8 shows a graphical representation of a typical electrical waveform measured at various points of the comparator circuit of FIG. 7.

The filtered signal leaving high pass filter 110 is passed through amplifier 112 to increase the amplitude of the signal by 10,000 times. FIG. 8 shows a typical waveform measured at various points through the electronic circuitry. Raw signal 200 from transducer 102 depicts a signal with small disturbances to the reflected waves superimposed on a 40 kHz carrier. Rectified signal 202 shows the signal after passing through rectifier 106. Filtered signal 204 shows the signal after passing through low pass filter 108 and high pass filter 110. Since the 40 kHz carrier signal is filtered out, all that remains are small amplitude disturbances, which are subsequently amplified by amplifier 112 to produce amplified signal 206. Amplified signal 206 shows the presence of an alarm signal followed by a period of normal conditions.

Figure 7:
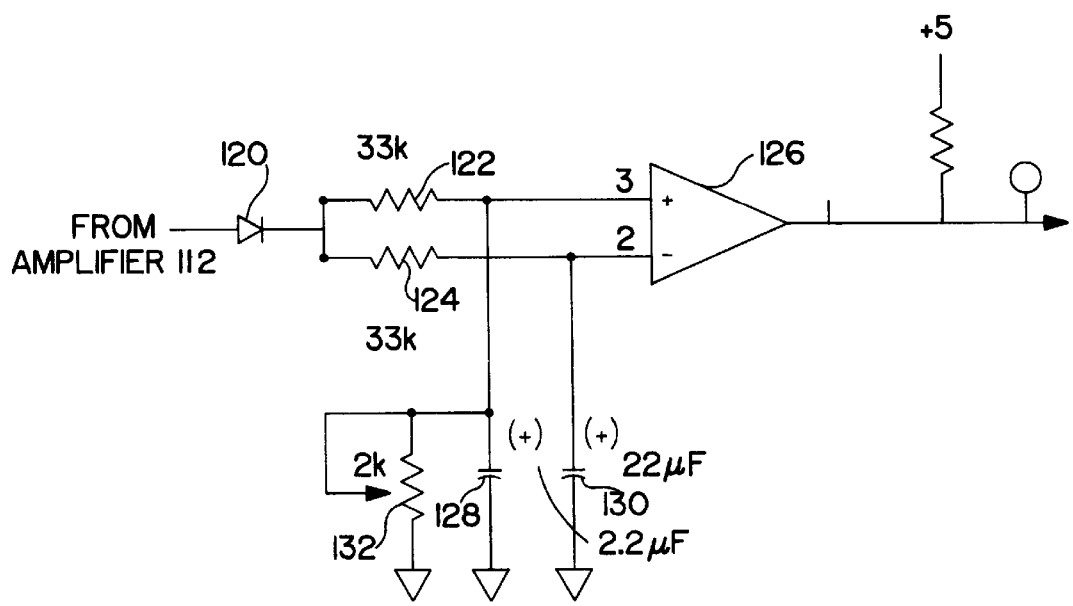
FIG. 7 shows a circuit diagram of the integrator/comparator of FIG. 5.

The amplified signal is passed into integrator/comparator 114 that adjusts for gradual increases in background noise. The preferred integrator/comparator arrangement is shown in FIG. 7. The output from amplifier 112 is passed through diode 120 and resistors 122 and 124, which are connected to the positive and negative input terminals, respectively, of operational amplifier ("op-amp") 126. Capacitor 128 is connected to the positive terminal of op-amp 126 and capacitor 130, of larger value that capacitor 128, is connected to the negative terminal, creating two resistor/capacitor networks with different time constants. Variable resistor 132 is placed across capacitor 128, creating a voltage divider network for adjusting the steady-state voltage at the positive terminal of op-amp 126 to be lower than the negative terminal voltage.

A sudden change in the amplitude of the output from amplifier 112 causes the smaller capacitor 128 to charge more quickly, lifting the voltage at the positive terminal of the op-amp above the negative terminal voltage and producing an output from the op-amp. However, a gradual increase in the amplitude of the output from amplifier 112, usually caused by background noise from wind or rain, allows enough time for both resistor/capacitor networks to charge and does not result in the positive terminal voltage rising above the negative terminal voltage. Thus only a steeply rising signal causes the op-amp to output an alarm signal. By this method integrator/comparator 114 avoids spurious alarms from background noise.

FIG. 8 shows a graphical representation of typical electrical waveforms measured at various points of the integrator/comparator circuit. Waveform 210 depicts an input to the integrator/comparator circuit measured at the output of diode 120 in FIG. 7. Waveform 212 depicts the corresponding waveform at the positive terminal of op-amp 126 in FIG. 7 and waveform 214 depicts the waveform at the negative terminal of the op-amp.

Waveform 210 is shown as a steady-state input from time T1 to T2, consequently waveform 212 and 214 have constant voltage where the positive op-amp terminal voltage is slightly below the negative terminal voltage due to the effect of variable resistor 132 in FIG. 7.

From time T2 to T3, waveform 210 is shown gradually increasing and decreasing, representing a typical background noise event such as a rain storm. Waveforms 212 and 214 show the positive and negative op-amp terminal voltages closely tracking waveform 210, with the positive terminal voltage always remaining at a lower value than the negative terminal voltage.

At time T4 waveform 210 shows a sharply rising signal, representing the entry of a person into the pool. Due to the longer charging time caused by the larger capacitor 130 in FIG. 7, the voltage on the negative op-amp terminal rises slower than the positive terminal voltage. The trigger point occurs when waveform 212 crosses 214, at which point the positive terminal voltage is then greater than the negative terminal voltage. Op-amp 126 of FIG. 7 amplifies this voltage difference to produce a signal that is used to trigger an alarm.

Since, in this embodiment of the invention, the integrator/comparator output produces an alarm signal which could be connected directly to an alarm, a microprocessor is not needed to perform the amplitude and frequency monitoring functions of the pool alarm system described above for an alarm situation. However, a microprocessor is used to perform additional optional features, including features to disable the pool alarm if the pool pump is started or the pool sweep is functioning.

When the pool pump is activated after being off for a period of time, the pump often emits a stream of air bubbles into the pool, which may be sufficient to trigger a false alarm. Therefore, the system detects the activation of a pump start and disables the alarm for a period of time, such as 30 seconds, to allow time for any air in the pump system to be ejected. Automatic pool sweeps often produce splashing during operation that may also trigger a false alarm. If pool sweep operation is detected, the alarm is disabled for a period of time, such as 30 seconds, after the sweep has been turned off.

Detection of pump and pool sweep operation may be accomplished by using an input from an external signal or by manual activation of one of the pool alarm system buttons. One embodiment of the pump and pool sweep operation detect system uses two springs placed in the pump and pool sweep water flow. The springs are helical springs of nickel plated steel, fixed to the pump or pool sweep apparatus at one end only. The length of the springs is chosen such that each spring will resonate at a particular frequency when water from the pump or pool sweep flows past it, the selected frequencies to be sufficiently different to enable discrimination between pump or pool sweep operation. Springs with resonant frequencies of 820 Hz and 990 Hz are used in this embodiment.

Figure 9:
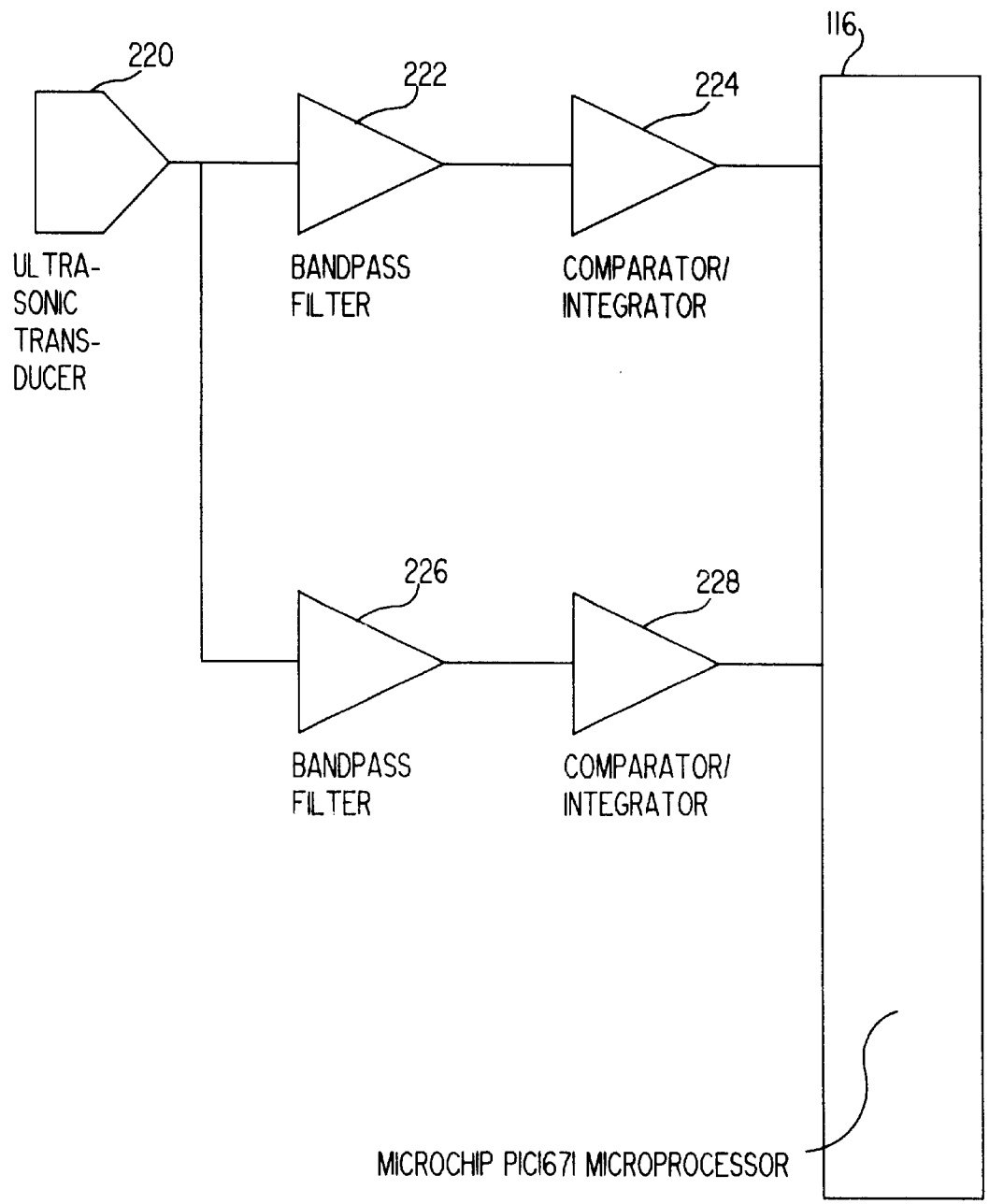
FIG. 9 shows a block diagram of the circuitry used to detect pool pump or pool sweep operation.

FIG. 9 shows a block diagram of the pump and pool sweep operation detect circuit. Piezoelectric transducer 220 is located in the pool water to detect the waves caused by the vibration of the springs. The signal from the transducer is fed to two separate circuits to detect pump operation (222 and 224) and pool sweep operation (226 and 228). Bandpass filter 222 eliminates signals at all frequencies except the resonant frequency of the pump spring. Integrator/comparator 224 compensates for the effect of a gradual rise in background noise and detects when the signal from the bandpass filter suddenly rises, as described in discussion of FIG. 7 above. The output of integrator/comparator 224 is input to processing means 230, which in the preferred embodiment is the MPU described above, to signal pool pump start. Bandpass filter 226 and integrator/comparator 228 detect the pool sweep operation and function in the same manner as that described above for detecting the pump operation. Output from integrator/comparator 228 is also an input to MPU 116 to signal pool sweep operation. The filter 222 and 226 and integrator/comparator 224 and 228 are comprised of components readily available and use techniques well known to those skilled in the art.

Another embodiment of a system for detecting pump and pool sweep operation uses a piezoelectric transducer to detect the signature vibration caused by operation of the pump or pool sweep. The frequency of the vibration is determined by the design of the pump, including such contributing factors as the AC power supply frequency, the number of poles in the motor, the motor slip frequency, and the number of blades on the pump impeller. A bandpass filter circuit and integrator/comparator circuit are used to detect and signal the presence of the signature vibration in the same manner as described above.

Yet another embodiment of a system for detecting pump and pool sweep operation uses a remote device attached to the electrical motor control circuit of the pump or pool sweep which transmits a radio frequency signal to the pool alarm when the pump or pool sweep control circuit is activated.

Another embodiment uses a coded input from the pool alarm buttons that will allow the user to manually disable the alarm during pump start or pool sweep operation.

MPU 116 is also used to perform the safety function implemented in the embodiment described above, including periodically transmitting signals to the remote receiver to verify that the system is functioning properly, periodically disabling the alarm to permit pool alarm maintenance, and monitoring the battery charge level.

Figure 10:
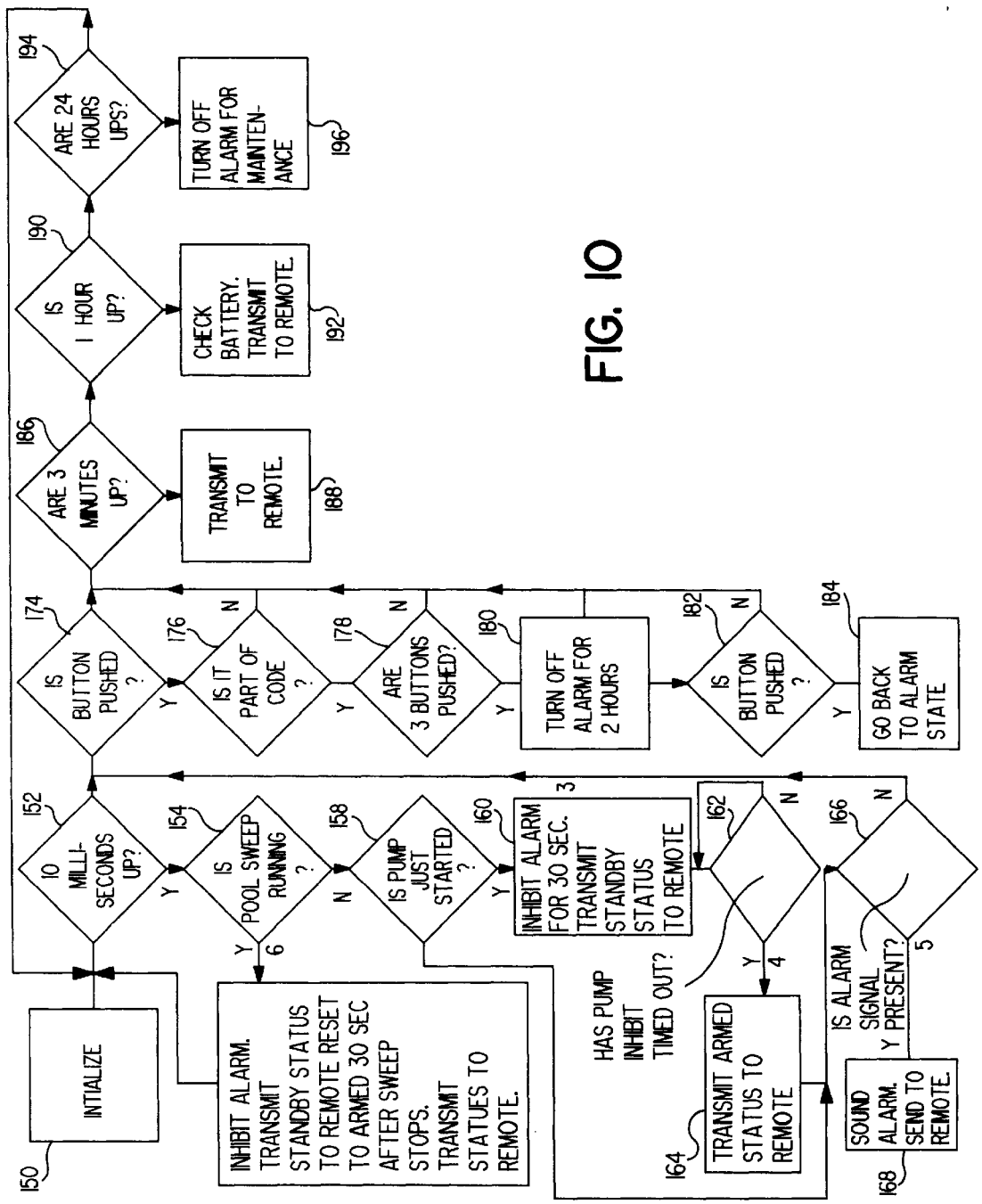
FIG. 10 shows a flowchart of the software used as an added feature of the preferred embodiment shown in FIG. 5.

FIG. 10 shows the flowchart of the software used to control the pool alarm system shown in FIG. 5. When batteries activate the system, the system is initialized in step 150. If the system detects that 10 milliseconds have passed, step 152, the MPU checks to see if the pool sweep is operating, step 154. If the sweep is on, the alarm is inhibited and the remote unit is put on standby until after a period of 30 seconds passes after the sweep is turned off, step 156.

If the pool sweep is off, the MPU determines whether the pool pump has just been activated, step 158, and if so, the alarm is inhibited, the remote unit is put on standby, and a 30 second timer is activated, step 160. The MPU waits until the 30 second pump inhibit timer is complete, step 162, and then re-enables the alarm and sends an alarm armed status to the remote, step 164. The MPU then checks to see if an alarm signal is present, step 168, and sounds an alarm if required, step 168.

The remainder of the flowchart is dedicated to optional features that are intended to assure the system is functioning properly. For example, buttons 142 are monitored to determine if anyone of them is depressed, step 174. If any buttons are depressed, then the MPU checks to see if any of the buttons are part of the security code designated by the state of dip switches 140, step 176. If any of the buttons are part of the code, then the MPU checks to see if the three buttons are depressed in the proper sequence signifying a disarming request, step 178. If the status of the buttons indicates that the alarm should be disarmed, then the alarm is turned off for a two hour period, step 180. The system remains in that state until either two hours elapses or a button is pushed to request reactivation, step 182. If the activation button is depressed then an interrupt is generated and MPU goes back to the alarm state, step 184, at which time the monitoring process restarts through step 172.

When step 172 and 174 are performed and no buttons are depressed, the MPU checks to see if three minutes have elapsed since the last time it transmitted a signal to remote unit 11, step 186. If three minutes have passed, MPU 116 transmits a signal to remote unit 11 by transmitter 148, step 188.

MPU 116 also performs a battery test once an hour to monitor the power level of the battery, step 190 and 192. The status is indicated on the actual unit itself and at the remote unit.

In order to accommodate automatic maintenance equipment used by many swimming pool owners, MPU 42 disarms the alarm for a predetermined period of time, so that the maintenance can be performed, step 194 and 196.

Each individual component of the apparatuses shown in FIGS. 3 and 5 is readily available. The preferred oscillator is comprised of a Motorola 14060 integrated circuit in conjunction with a 5.06 MHz crystal, configured in accordance with techniques well known to one of ordinary skill in the art to produce signal at approximately 40 KHz. However, many other oscillator designs could be used to preferably generate a sound wave at an inaudible frequency.

Although a suitable transducer may be selected and used by one of ordinary skill in the art, the preferred transducer includes an active element and potting material, both integrated into a suitable mounting arrangement. The preferred active element is a tubular piezoelectric ceramic element manufactured by EDO Corporation, material type EC-69 composed of lead zirconate titanate, part no. AD4205, with dimensions of 1 inch in length, 1.095 inches in outer diameter and 0.095 inches in wall thickness. The preferred potting material is polyurethane.

When configuring a transducer, an inductor along with the capacitive effect of the transducer make up a tuned circuit at the driving frequency. The circuit is tuned to convert the square wave output of the oscillator into a smooth sine wave driving the transducer. The inductor is selected to maximize the conversion of electrical energy into acoustic energy in the water.

Amplifier 112 is also comprised of a typical transistor/resistor/comparator arrangement well known to those of ordinary skill in the art. Integrator/comparator 114 is comprised the components shown in FIG. 7. However, any circuitry capable of performing the integrating and comparing functions of integrator/comparator 114, such as a microprocessor or discrete components well known to those of ordinary skill in the art, may be used.

The circuitry specified above could be modified by one of ordinary skill in the art without departing from the scope of the invention. For example, the rectifier and the integrator/comparator could both be replaced by a processing means capable of averaging the amplitudes represented in the waveform produced by the sound wave detector or just the integrator/comparator could be replaced by a processing means. Also, the signal generator could be replaced by a mechanism to detect sound waves in the frequencies of interest, including those produced by an object entering a body of water. Filtering may not be necessary in this situation.

Although the preferred embodiment of this invention is battery operated, the system could be modified to run off of alternating current power by one of ordinary skill in the art without departing from the scope of this invention.

From the foregoing it will be seen that this invention is one well adapted to attain all of the features and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A method of detecting entry of an object into a body of water, comprising the steps of:

establishing a standing wave in the body of water;

separating from the standing wave a sound wave having a predetermined frequency that is expected to occur when the object enters the body of water;

producing two electrical signals having amplitudes related to the amplitude of the sound wave, at least one of which represents an average of the amplitude of the sound wave;

detecting when the amplitude of one of the electrical signals exceeds the amplitude of the other electrical signal by a predetermined amount; and thereafter generating an alarm signal that is used to activate an alarm.

2. A method of detecting entry of an object into a body of water, comprising the steps of:

transmitting a controlled sound wave into the body of water to set up a standing wave;

detecting a sound wave having a predetermined frequency that is expected to occur when the object enters the body of water, the predetermined frequency being different than the frequency of the controlled sound wave;

filtering the controlled sound wave from the detected sound wave;

producing two electrical signals having amplitudes related to the amplitude of the detected sound wave, at least one of which represents an average of the amplitude of the detected sound wave;

detecting when the amplitude of one of the electrical signals exceeds the amplitude of the other electrical signal by a predetermined amount; and thereafter generating an alarm signal that is used to activate an alarm.

3. The method of claim 2, wherein the controlled sound wave is of an ultrasonic frequency.

4. The method of claim 2, wherein the transmitting and detecting of sound waves is performed by a single transducer.

5. The method of claim 1, additionally comprising the step of:

transmitting the alarm signal to a remote system in order to activate a remote alarm.

6. The method of claim 1, wherein the body of water is a pool and additionally comprising the steps of:

identifying the activation of a pool pump; and disabling the alarm when the pool pump is activated.

7. The method of claim 1, wherein the body of water is a pool and additionally comprising the steps of:

identifying the activation of a pool sweep; and disabling the alarm signal when the pool sweep is activated.

8. The method of claim 1, additionally comprising the step of rectifying the sound wave.

9. A method of detecting entry of an object into a body of water, comprising the steps of:

establishing a standing wave in the body of water;

separating from the standing wave a sound wave having a component in a predetermined range of frequencies expected to occur when the object enters the body of water;

producing two electrical signals having amplitudes related to the amplitude of the sound wave, at least one of which represents an average of the amplitude of the sound wave;

detecting when the amplitude of one of the electrical signals exceeds the amplitude of the other electrical signal by a predetermined amount; and thereafter generating an alarm signal that is used to activate an alarm.

10. A method of detecting entry of an object into a body of water, comprising the steps of:

transmitting a controlled sound wave into the body of water to set up a standing wave;

detecting a sound wave having a component in a predetermined range of frequencies expected to occur when the object enters the body of water, the predetermined range of frequencies excluding the frequency of the controlled sound wave;

producing two electrical signals having amplitudes related to the amplitude of the detected sound wave in the predetermined frequency range, at least one of which represents an average of the amplitude of the detected sound wave;

filtering the controlled sound wave from the detected sound wave;

detecting when the amplitude of one of the electrical signals exceeds the amplitude of the other electrical signal by a predetermined amount; and thereafter generating an alarm signal that is used to activate an alarm.

11. The method of claim 10, wherein the transmitting and detecting of sound waves is performed by a single transducer.

12. The method of claim 9 additionally comprising the step of rectifying the detected sound wave.

13. An apparatus for detecting entry of an object into a body of water, comprising:

a transmitter to establish a standing wave in the body of water;

a sound wave detector for separating from the standing wave a sound wave having at least one predetermined frequency expected to occur when the object enters the body of water and for producing an electrical output waveform representing the detected sound wave;

a rectifier electrically connected to the sound wave detector for rectifying the electrical output waveform;

an integrator/comparator electrically connected to the rectifier for producing two electrical signals having amplitudes related to the amplitude of the electrical output waveform, at least one of which represents an average of the amplitude of the electrical output waveform, and for generating an alarm signal when the amplitude of one of the electrical signals exceeds the amplitude of the other electrical signal by a predetermined amount; and an alarm electrically connected to the integrator/comparator that is activated in response to the alarm signal.

14. An apparatus for detecting entry of an object into a body of water, comprising:

a signal generator for transmitting a controlled sound wave into the body of water to set up a standing wave;

a sound wave detector for receiving a sound wave having at least one predetermined frequency expected to occur when the object enters the body of water, the predetermined frequency being different than the frequency of the standing wave, and for producing an electrical output waveform representing the detected sound wave;

a rectifier electrically connected to the sound wave detector for rectifying the electrical output waveform;

a filter for removing the controlled sound wave from the electrical output waveform;

an integrator/comparator electrically connected to the rectifier for producing two electrical signals having amplitudes related to the amplitude of the electrical output waveform, at least one of which represents an average of the amplitude of the electrical output waveform, and for generating an alarm signal when the amplitude of one of the electrical signals exceeds the amplitude of the other electrical signal by a predetermined amount; and an alarm electrically connected to the integrator/comparator that is activated in response to the alarm signal.

15. The apparatus of claim 14, wherein the sound wave detector and the signal generator are the same transducer.

16. The apparatus of claim 13, additionally comprising:

a processing means interposed between the integrator/comparator and the alarm for activating the alarm in response to the alarm signal.

17. An apparatus for detecting entry of an object into a body of water, comprising:

a transmitter to establish a standing wave in the body of water;

a sound wave detector for separating from the standing wave a sound wave having at least one predetermined frequency expected to occur when the object enters the body of water and for producing an electrical output waveform representing the detected sound wave;

a processing means electrically connected to the sound wave detector for producing two electrical signals having amplitudes related to the amplitude of the electrical output waveform, a first one of which represents an average of the amplitude of the electrical output waveform, and for producing an alarm signal when amplitude of one of the electrical signals exceeds the amplitude of the other electrical signal by predetermined amount; and an alarm electrically connected to the processing means that is activated in response to the alarm signal.

18. The apparatus of claim 17, additionally comprising a rectifier interposed between the sound wave detector and the processing means for rectifying the electrical output waveform.

19. An apparatus for detecting entry of an object into a body of water, comprising:

a transmitter to establish a standing wave in the body of water;

sound wave detecting means for separating from the standing wave a sound wave having at least one predetermined frequency expected to occur when the object enters the body of water;

signal output means connected to the sound wave detecting means for producing an electrical output waveform representing the detected sound wave;

averaging means connected to the signal output means for producing two electrical signals having amplitudes related to the amplitude of the electrical output waveform, at least one of which represents an average of the amplitude of the electrical output waveform, and for producing an alarm signal when the amplitude of one of the electrical signals exceeds the amplitude of the other electrical signal by a predetermined amount; and alarm activation means connected to the averaging means for activating an alarm in response to the alarm signal.

20. The apparatus of claim 19, wherein the averaging means comprises:

a rectifier and an integrator/comparator.

21. The apparatus of claim 19, wherein the averaging means comprises:
a processor.

22. A method of detecting entry of an object into a body of water, comprising the steps of:
transmitting a sound wave into the body of water to set up a standing wave that is disturbed when the object enters the body of water;
detecting the disturbed sound wave and producing an electrical output waveform indicating the amplitude and frequency of the disturbed sound wave;
producing two electrical signals having amplitudes related to the amplitude of the electrical output waveform, at least one of which represents an average of the amplitude of the electrical output waveform;
generating an alarm signal when the amplitude of one of the electrical signals exceeds the amplitude of the other electrical signal by a predetermined amount, indicating the entry of the object into the body of water; and
activating an alarm in response to the alarm signal.

23. The method of claim 22, wherein producing the two electrical signals comprises the step of continuously integrating the electrical output waveform to produce at least one of the electrical signals.

24. The method of claim 22, additionally comprising the steps of:
monitoring the electrical output waveform to detect when the frequency of the electrical output waveform reaches a predetermined frequency indicating the entry of the object into the body of water; and
activating the alarm only when the alarm signal has been generated and the frequency of the electrical output waveform reaches the predetermined frequency.

25. The method of claim 24, wherein the predetermined frequency is represented by:
a predetermined number of slope changes in the electrical output waveform detected within a predetermined time period.

26. The method of claim 22, wherein activating the alarm comprises the step of:
transmitting the alarm signal to a remote system in order to activate a remote alarm.

27. The method in accordance with claim 22, wherein the sound wave is of an ultrasonic frequency.

28. The method of claim 22, additionally comprising the step of rectifying the electrical output waveform.

29. An apparatus for detecting entry of an object into a body of water, comprising:
means for transmitting a sound wave into the body of water to set up a standing wave that is disturbed when the object enters the body of water;
means for detecting the disturbed sound wave and for producing an electrical output waveform representing the disturbed sound wave;
means for producing two electrical signals having amplitudes related to the amplitude of the electrical output waveform, at least one of which represents an average of the amplitude of the electrical output waveform;
means for generating an alarm signal when the amplitude of one of the electrical signals exceeds the amplitude of the other electrical signal by a predetermined amount, indicating the entry of the object into the body of water; and
means for activating an alarm in response to the alarm signal.

30. The apparatus of claim 29, wherein the means for producing the two electrical signals comprises:
a rectifier and an integrator.

31. The apparatus of claim 29, wherein the means for producing the two electrical signals comprises:
a processor.

32. An apparatus for detecting entry of an object over a predetermined size into a body of water, comprising:
a signal generator for transmitting a sound wave into the body of water to set up a standing wave that is disturbed when the object enters the body of water;
a sound wave detector for receiving the disturbed sound wave and producing an electrical output waveform indicating the amplitude and frequency of the disturbed sound wave;
processing means electrically connected to the sound wave detector for producing two electrical signals having amplitudes related to the amplitude of the electrical output waveform, at least one of which represents an average of the amplitude of the electrical output waveform, and for detecting when the amplitude of one of the electrical signals exceeds the amplitude of the other electrical signal by a predetermined amount, indicating the entry of the object into the body of water; and
an alarm electrically connected to the processing means that is activated in response to the alarm signal.

33. The method of claim 1 wherein both electrical signals represent an average of the amplitude of the sound wave.

34. The method of claim 33 wherein producing the two electrical signals comprises averaging the amplitude of the sound wave with two averaging circuits having different time constants.

35. The method of claim 1 further comprising detecting a predetermined number of slope changes in the sound wave in a predetermined period of time.

36. The method of claim 35 further comprising activating the alarm only after the alarm signal has been generated and the predetermined number of slope changes have been detected in the predetermined period of time.

37. The apparatus of claim 17 wherein both electrical signals represent an average of the amplitude of the electrical output waveform.

38. The apparatus of claim 17 further comprising a slope change detector that detects a predetermined number of slope changes in the electrical output waveform in a predetermined period of time.

39. The apparatus of claim 38 wherein the alarm is activated only after the alarm signal has been generated and the predetermined number of slope changes have been detected in the predetermined period of time.

40. The method of claim 22 wherein both electrical signals represent an average of the amplitude of the electrical output waveform.

41. The method of claim 40 wherein producing the two electrical signals comprises averaging the amplitude of the electrical output waveform with two averaging circuits having different time constants.

42. The method of claim 22 further comprising detecting a predetermined number of slope changes in the electrical output waveform in a predetermined period of time.

43. The method of claim 42 further comprising activating the alarm only after the alarm signal has been generated and the predetermined number of slope changes have been detected in the predetermined period of time.

44. The apparatus of claim 29 wherein both electrical signals represent an average of the amplitude of the electrical output waveform.

45. The apparatus of claim 29 further comprising means for detecting a predetermined number of slope changes in the electrical output waveform in a predetermined period of time.

46. The apparatus of claim 45 wherein the means for activating the alarm actually activates the alarm only after the alarm signal has been generated and the predetermined number of slope changes have been detected in the predetermined period of time.

* * * * *